Dec. 1, 1953   I. L. ASHKENAS   2,661,169
AIRCRAFT CONTROL STICK FORCE LINKAGE
Filed April 18, 1949   4 Sheets-Sheet 1

INVENTOR:
IRVING L. ASHKENAS
BY Herbert E. Metcalf
Attorney

Dec. 1, 1953  I. L. ASHKENAS  2,661,169
AIRCRAFT CONTROL STICK FORCE LINKAGE
Filed April 18, 1949  4 Sheets-Sheet 2
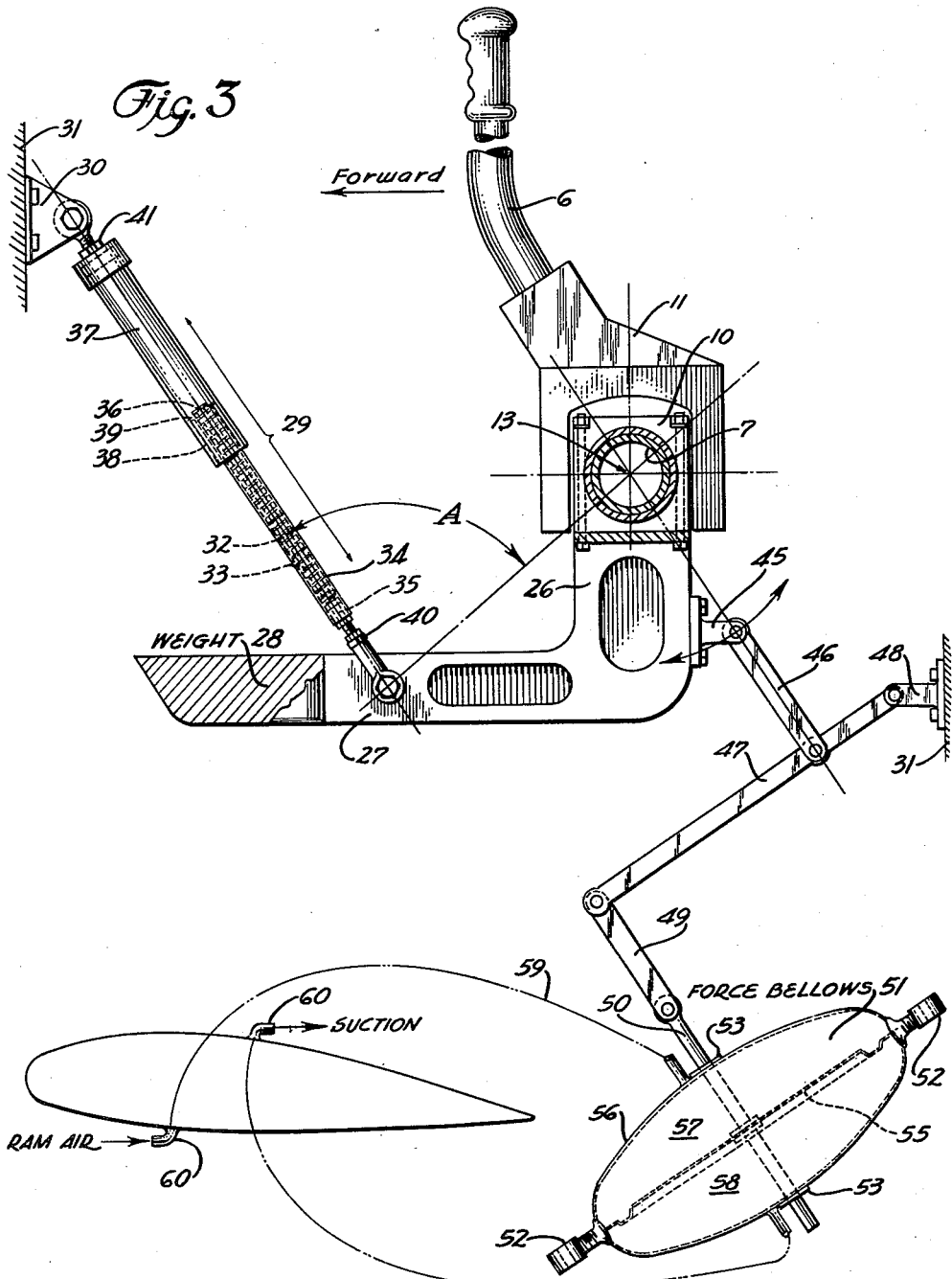
INVENTOR.
IRVING L. ASHKENAS
BY
Herbert E. Metcalf
Attorney

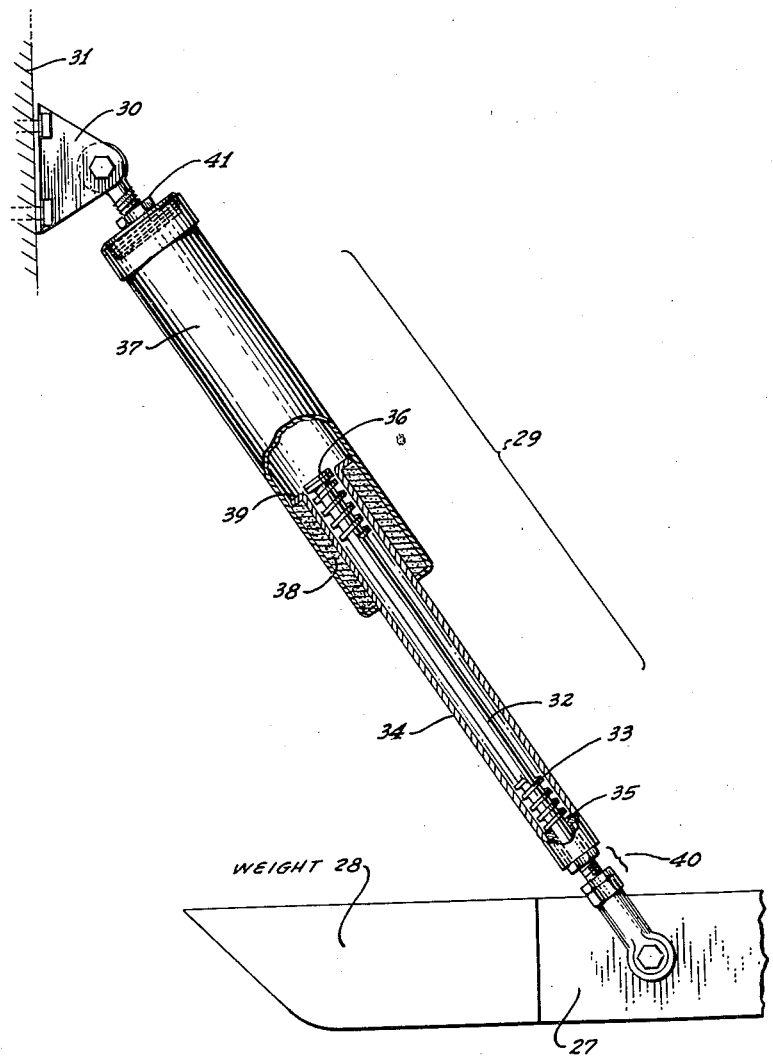

Dec. 1, 1953      I. L. ASHKENAS      2,661,169
AIRCRAFT CONTROL STICK FORCE LINKAGE
Filed April 18, 1949      4 Sheets-Sheet 4

INVENTOR.
IRVING L. ASHKENAS
BY Herbert E. Metcalf
Attorney

Patented Dec. 1, 1953

2,661,169

UNITED STATES PATENT OFFICE 2,661,169

AIRCRAFT CONTROL STICK FORCE LINKAGE

Irving L. Ashkenas, Los Angeles, Calif., assignor to Northrop Aircraft, Inc., Hawthorne, Calif., a corporation of California Application April 18, 1949, Serial No. 88,165

10 Claims. (Cl. 244—83)

This invention relates to airplane controls, and more partciularly, to an improved force producer capable of exerting forces on an airplane control stick or column proportional to airspeed and applied vertical load.

In airplanes having power operated control surfaces, no surface load is transmitted to the pilot from the control surfaces through the control stick, or rudder pedals, so that he has no indication by means of "feel" as to the position of those control surfaces. Hence it is desirable to provide a synthetic "feel" in order to simulate conventional piloting procedures. A device providing control centering forces increasing with increased airspeed is disclosed in the co-pending application of Ashkenas, Serial No. 52,367, filed October 1, 1948, now abandoned.

The degree of "feel" required is particularly critical in control operations involving the elevator surfaces, where the accelerations of the airplane in the direction of its vertical axis (herein termed normal accelerations) are most likely to cause structural overload. The criterion usually employed to define the "feel" in the elevator control is the stick force required to produce an increment in normal acceleration equal to the acceleration of gravity, "g."

A manually operated, direct connected control system will, for a given center of gravity location, produce constant stick force per "g" independent of airplane speed. However, such a control system results in a different stick force vs. normal acceleration relationship for each different location of the airplane's center of gravity. With the center of gravity near its extreme aft limit, higher normal accelerations can be applied with substantially less stick force than if the C. G. is toward its forward limit.

Therefore, it is an object of the present invention to provide a simple control stick force producer which has, as nearly as possible, the characteristic of constant stick force per "g," independent of speed and C. G. location.

Another required characteristic of any control force producer is that it be capable of returning the stick to its trimmed position at any given airplane speed; and, further, that the returning force, for slow speed changes at the normal load factor of 1 "g," increase with the speed increment from trim. In general, the ability of the control force producer to return the stick to neutral will depend directly on the gradient of force per degree of stick or column motion at 1 "g," and inversely on the system friction. If the control force gradient varies as the airplane velocity squared, then the error in centering due to friction is such that the resulting error in airplane trim speed is a constant percentage of the particular trim speed. Therefore a control force producer which is responsive to the column position and velocity squared will satisfy stick centering and force gradient requirements.

It is another object of this invention to provide a control stick force producer responsive to both airspeed and normal acceleration thus more nearly simulating actual flight conditions.

If the control force producer embodies a forward-pulling weight to give improved "g" feel and is also responsive to column position and speed squared, as required for "speed-feel;" then, as the airplane speed is reduced, the forward pulling weight will shift the zero force position of the column forward. If there is no trim means available on the column itself, as would be the case with an adjustable trimming surface separate from the normal control surface, then the zero force position of the column for landing operations may be very far forward. In such a case, excessive trimming power would be required of the trim surface; and further, the pilot's control would be impaired by the required extreme extension of his arms.

It is another object of this invention to provide a means for limiting the forward "hands-off" position of the control column.

Other objects of this invention will be apparent or will be specifically pointed out in the description forming a part of this specification, but the invention is not deemed to be limited to the embodiments herein described, as various forms may be adopted within the scope of the appended claims.

The invention may be more fully understood by reference to the accompanying drawings, wherein:

Figure 3 is a left side elevation view, partly diagrammatic, showing the same control stick, to which is connected a bob weight, compensating spring, and airspeed bellows linkage.

Figure 3a is a cut-away side view showing the compensating spring assembly of Figure 3 on a larger scale.

In broad terms, the invention comprises a control for an airplane in which the elevation controlling surfaces are actuated by a pilot's control element with little or no feel-back to the pilot. Means are provided to produce a force applied to said control element to center this element, and a weight is provided and connected to the control element to create a force, under normal accelerations experienced by said airplane, modifying the centering force, preferably in a direction tending to move the control element in a direction reducing the acceleration.

In more specific terms, the present invention comprises a bob weight attached to the airplane control stick or column, this weight being forward of the stick pivot, elastic means balancing the bob weight at a predetermined position, and a control force bellows or equivalent device actuated by ram air pressure, acting to center the stick to a second predetermined position.

Figure 1:
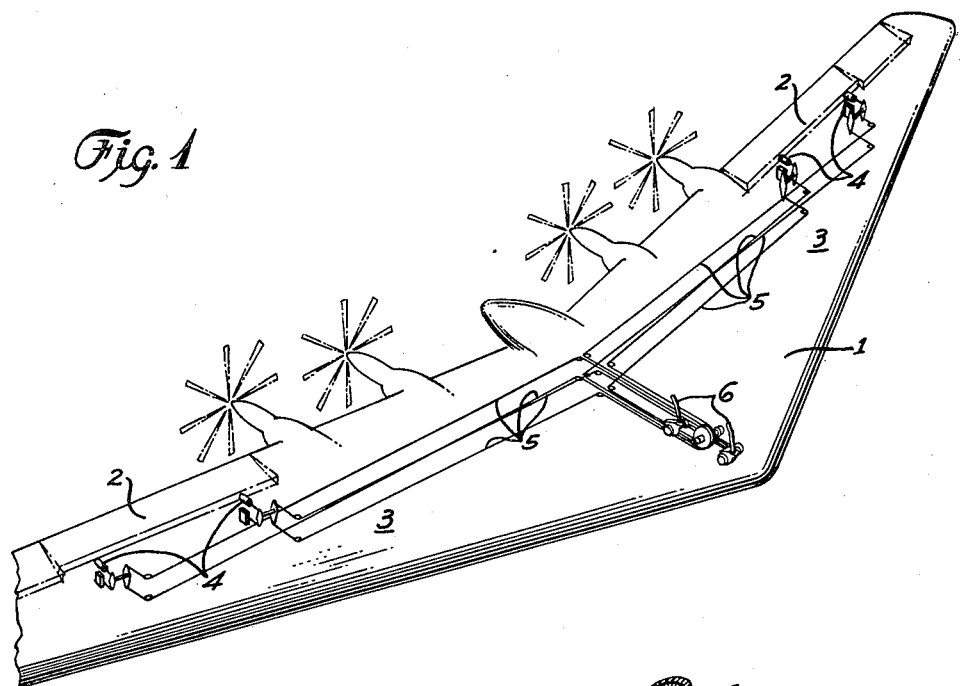
Figure 1 is a perspective view of an airplane having a pair of control surfaces operating both as elevators and ailerons, showing the connections thereof to a pair of control sticks.

Referring directly to Figure 1, an all-wing airplane 1 is provided with a pair of control surfaces known as elevons 2, one mounted in the trailing edge of each outer wing panel 3. Each elevon 2 is rotated about its hinge line by hydraulically-operated servo-controlled actuators 4. A conventional cable-connected control system 5 is provided between the actuators 4 and a pair of interconnected control sticks 6 located in the flight compartment.

Figure 2:
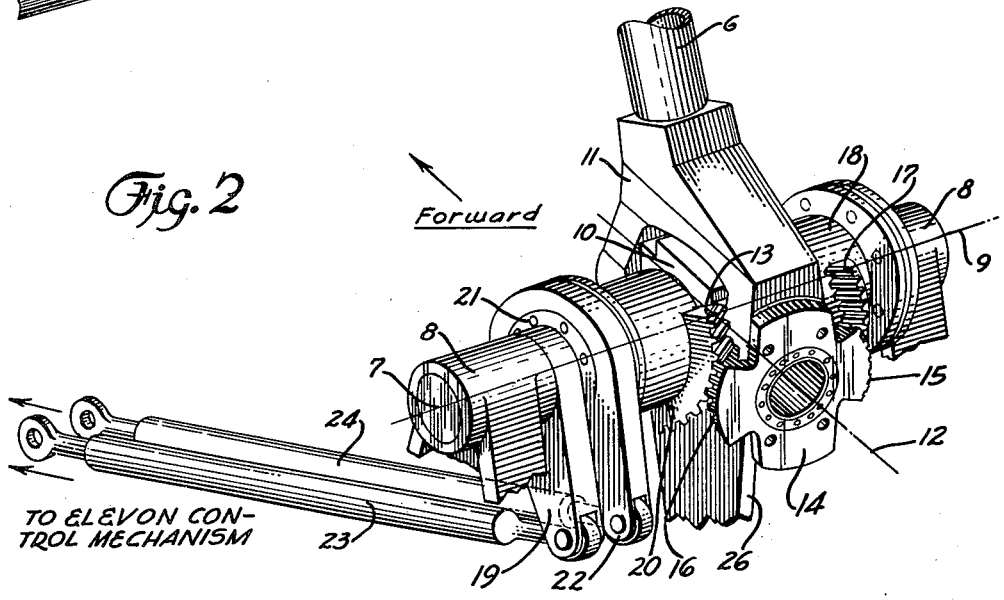
Figure 2 is a perspective view of one of the control sticks in Figure 1, on a larger scale, showing the mechanism for combining elevator and aileron control in the control surfaces.

In Figure 2, a stick trunnion 7 is rotatably mounted on support bearings 8 about a trunnion axis 9 parallel to the lateral axis of the airplane 1. The stick trunnion 7 carries a trunnion block 10 to which is rotatably connected a yoke 11. The yoke is fitted with one of the control sticks 6 projecting upwardly and can be rotated about a yoke axis 12 parallel to the airplane's longitudinal axis. Thus the stick 6 can be moved fore-and-aft, rotating about the trunnion axis 9, or sideways, rotating about the yoke axis 12, or any combination of these two directions. The yoke axis 12 intersects the trunnion axis 9 at a point herein termed the stick pivot 13.

The yoke 11 carries a gear plate 14 with two beveled pinions 15 and 16, one on each side of the yoke axis 12. The right-hand pinion 15 meshes with a beveled gear sector 17 fixed to a sector shaft 18 on the right-hand side of the trunnion block 10. This sector shaft 18 extends through the trunnion 7 to the left-hand side of the trunnion block 10, where it is fixed to a right-hand control arm 19. The left-hand pinion 16 meshes with a similar beveled gear sector 20 rotatably mounted on the trunnion 7 by sector bearings 21. This left-hand sector 20 is fixed to a left-hand control arm 22.

Each control arm 19 and 22 is connected, through a control rod 23 and 24 respectively, to the cable system 5 (Figure 1) for independent movement of one of the elevons 2. The stick motion mixer just described functions to move both elevons 2 in the same direction, for elevation control, when the control stick 6 is moved in a fore-and-aft direction, and to move the respective elevons 2 in opposite directions, for lateral control, when the control stick 6 is moved in a lateral direction, thus enabling the elevons to act both as elevators and ailerons.

As shown in Figure 3, a support 26 is fixed to the bottom of the trunnion block 10. The support 26 carries a forwardly extending leg 27 provided at its forward end with a bob weight 28, which may be a quantity of lead. A balance spring assembly 29 is connected between the support leg 27 and a bracket 30 on the airplane structure 31 located above the bob weight 28.

The spring assembly (Figures 3 and 3a) contains a central tension rod 32 pivotally connected to the support leg 27 and surrounded by a compression spring 33, which is enclosed in a spring casing 34. The lower end of the spring casing 34 contains a lower oilite bearing 35 through which the tension rod 32 can slide and upon which the bottom of the compression spring 33 rests. The top of the compression spring 33 butts against a shoulder 36 of the tension rod 32, thus confining the spring between the lower oilite bearing 35 and the shoulder 36.

The spring casing 34 assembles within a housing 37 and is prevented from pulling out of the housing 37 by an upper oilite bearing 38 which is fixed within the housing and slidably surrounds the casing 34 so that it can be contacted by a flange 39 on the upper end of the casing 34. The spring casing 34, therefore, can slide freely within the housing 37 to shorten the entire assembly, but is positively limited in its downward travel by the flange 39. When tension is placed on the spring assembly 29 after contact of the flange 39 against the upper oilite bearing 38, the tension rod 32 will extend by sliding in the lower oilite bearing 35 and picking up compression spring 33 by shoulder 36. Further lengthening of the assembly will cause additional compression of the spring 33, accompanied by a proportionally increasing reaction tending to shorten the spring assembly 29.

The balance spring assembly 29 is provided with rod adjustment fittings 40 and housing adjustment fittings 41 by means of which the pull of the spring may be adjusted to a predetermined value at a given control stick position. Angle A, between the center line of the spring assembly 29 and its moment arm about the stick pivot 13 is preferably designed to be 90° at some position within the normal range of stick movement.

Since the support 26 is fixed to the trunnion block 10, the spring assembly 29 and its connections are required to move in one plane only, because the trunnion block 10 does not rock laterally when the control stick 6 is moved from side to side.

As so far described, it is evident that the bob weight 28 causes a forward pull on the control stick from the neutral position, which will be referred to as 0 degrees, and the spring assembly 29 resists forward motion of the stick 6, thereby providing a position of equilibrium where the moment of spring force about the stick pivot 13 exactly equals the moment of bob weight force. Thus, when a positive increase of normal acceleration (upward) of the airplane occurs in flight, the inertia of the bob weight mass will increase the bob weight force and tend to pull the control stick 6 forward until the spring force, which does not vary except as a result of change in length, has increased to rebalance the stick at a new position. Since this forward motion of the stick is in the direction to lower the elevator surfaces, the tendency will be to reduce the positive normal acceleration and thereby remove stress from the airplane structure. As the normal acceleration increases in this direction, the forward force on the stick becomes greater, and more backward pull by the pilot is required to maintain the high positive acceleration. The system therefore, serves as an indication to the pilot of the applied load.

Of course, negative accelerations are similarly detected, since in this case the moment of bob weight force is reduced, and the spring action will tend to move the stick aft, this being the direction to raise the elevators.

A plain tension spring could be used in place of the compression spring assembly, but the present embodiment is preferred, because in case of spring breakage, the tension spring force would be lost entirely, while the parts still remain together should the compression spring fail, the pieces merely being pushed close together, with the probability that manual trimming operations will bring control back to normal conditions.

The purpose of the sliding action of the spring assembly is to remove all spring force entirely when the stick is in the aft positions where high positive accelerations usually occur, thus leaving only the bob weight force, which is always in the direction to produce forward stick movement and relieve high positive stresses.

This system is especially valuable when applied to an airplane having power-operated control surfaces because of the fact that acceleration-excited impulses produced by the bob weight can directly influence the position of the control surface, but change of control surface position cannot directly influence the control stick or bob weight, since the power-operated control system is irreversible. No consideration need be given, therefore, to interaction between control surface and bob weight which might cause oscillation or flutter, since these objectionable conditions are prevented. Nevertheless, this system will work satisfactorily in an airplane using a conventional direct-connected surface control system.

A force is also made to act on the control stick of Figure 2 by a bellows linkage as shown therein. Attached to the support 26 beneath the stick pivot 13 is a support bracket 45 connected by a link 46 to a lever 47. Link 46 meets lever 47 substantially at right angles, and one end of lever 47 is pivotally connected to a lever bracket 48 secured to the aircraft structure 31. The opposite end of lever 47 connects at right angles to a connecting rod 49 in turn connected to a bellows shaft 50 of a force bellows 51. Bellows shaft 50 is movable along its longitudinal center line, and the center line of connecting rod 49 lies substantially in line with bellows shaft 50, so that endwise motion of bellows shaft 50 results in practically the same motion of connection rod 49.

The connection of link 46 to lever 47 is nearer the lever backet 48 than it is to the connecting rod 49, so that a given force in connecting rod 49 will be substantially increased in link 46. Force bellows 51 is mounted in a fixed position by lugs 52, and connecting rod 49 is provided in order to allow for the arcuate path of lever 47 without causing binding between bellows shaft 50 and its guides 53.

The force bellows 51 itself may conform with the construction shown in the application of Ashkenas, Serial No. 52,367, filed October 1, 1948. It consists essentially of a movable diaphragm 55, to which the bellows shaft 50 is attached, enclosed in an envelope 56 to divide the interior into a pressure chamber 57 and a static or suction chamber 58. The pressure chamber 57 is connected by tubing 59 to a ram air pipe 60 projecting forward into the air stream, and suction chamber 58 is similarly connected to a suction pipe 60 located in an area of low or negative static pressure.

At any flying speed of the airplane, pressure differential causes a certain tension force to act on bellows shaft 50 and connecting rod 49. This force is amplified by action of lever 47 and appears as a certain increased tensile force in link 46. When control stick 6 is at any position except 0 degrees, the force in link 46 exerts a moment about the stick pivot 13 tending to restore the stick to 0 degrees. In this neutral position, the moment arm of the link force becomes zero, hence no load in a fore-and-aft direction is imposed on the stick. For a constant airspeed, this restoring torque increases with increment of control stick movement away from neutral, because the moment arm length increases. The force applied by the diaphragm 55 to the bellows shaft 50 increases approximately as the square of the airspeed, resulting in a higher restoring force at any given stick position except neutral.

The bob weight, balance spring, and bellows linkage now combine to produce a resultant stick load in accordance with changes in airspeed, normal acceleration, and stick position. This stick load provides the necessary "feel" for the pilot, who counterbalances the stick load by substantially equal and opposite pressure on the stick handle. Since the force produced on the control stick by the bob weight does not change as a result of shift in C. G. position, the resultant stick force per "g" of normal acceleration is more nearly a constant value than if an airspeed-responsive device, alone, were employed.

Figure 4:
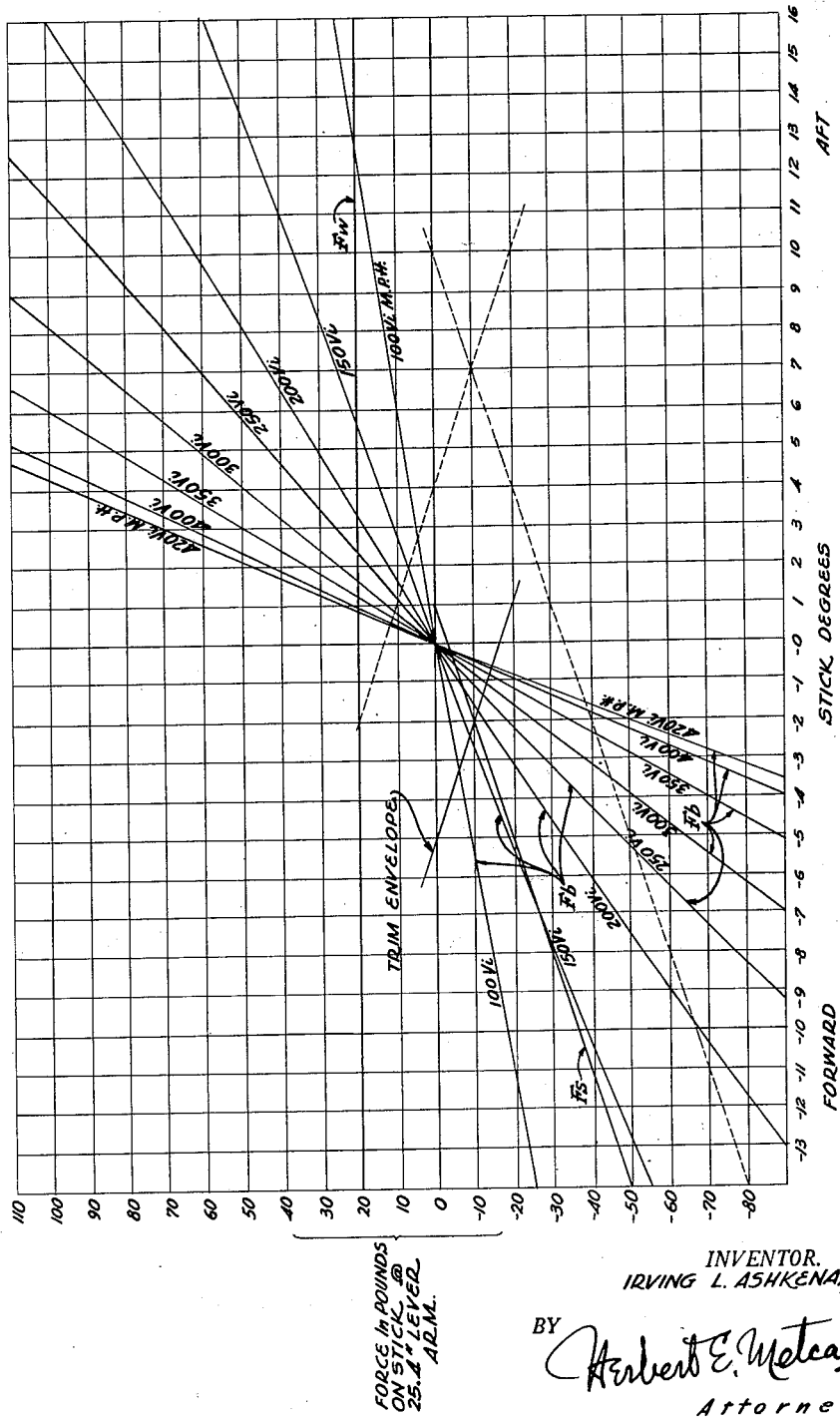
Figure 4 is a chart showing the aerodynamics of the force linkages of Figure 3, from which may be computed the load on the control stick at the point normally acted upon by the pilot's hand.

Various values of bob weight, spring force, range of spring force relative to stick position, and bellows force can be used, depending upon the characteristics desired. Figure 4 shows one embodiment of this combination as presently used in the Air Force's YB-49 eight-jet bomber, a Flying Wing incorporating fully powered surface controls and having a gross weight of over 200,000 pounds. The vertical scale on this chart reads in pounds of force produced on the control stick perpendicularly at a point 25.4 inches above the stick pivot, neglecting friction, which is the position occupied by the pilot's hand, and therefore represents the amount of force necessary to be applied in the opposite direction to maintain the stick in equilibrium. Positive forces are those produced by the control system in a stick-forward direction, and negative forces are those applied in a stick-after direction.

Line Fs gives stick force applied by the balance spring assembly alone. This force amounts to minus 50 pounds at minus 14 degrees stick position (forward) and 0 at plus 1 degree stick position (aft). Line Fw gives the stick force applied by the bob weight alone at a normal load factor of 1 "g," or level flight. Fw equals plus 20 pounds substantially throughout the range of stick travel. With these two forces only acting on the stick it will come to rest, or reach a trimmed position, at minus 5 degrees, since Fw cancels Fs at this point. While undergoing an increased normal acceleration (for example, a load factor of 2) the force Fw would equal 20 times 2 or plus 40 pounds at the stick handle.

The sloping lines crossing at the vertex of the graph of Figure 4 give Fb, which is the stick force produced by the bellows linkage alone at all stick positions for various indicated airspeeds (Vi) as marked. For example, at 250 M. P. H. with the stick at plus 4 degrees, Fb equals plus 35 pounds, while at the same speed but a stick position of minus 3 degrees, Fb equals minus 27.5 pounds.

Total stick force therefore equals Fb plus Fs plus $n$ times Fw, where $n$ is the load factor. As an example, at the time the airplane is flying 300 M. P. H., stick at plus 5 degrees, and under a load factor of plus 1.5, the total stick force is 62 plus 0 plus 20 times 1.5, or plus 92 pounds.

With the line Fs positioned as shown in this preferred embodiment, the condition is obtained which causes forward stick forces at low speeds. This is explained as follows: On the chart, the line labeled Trim Envelope provides a means of determining the stick position which would occur if flown "hands off." For instance, at 250 M. P. H., with a load factor of 1, resultant total stick force equals 0 at minus 1.3 stick degrees, approximately, which is established by noting the stick position where the Trim Envelope intersects the 250 Vi line. However, at a lower airspeed, say 100 M. P. H., and stick still at minus 1.3 degrees, a force of minus 2 minus 8 plus 20 equals plus 10 pounds is exerted on the stick in the forward direction. To trim the airplane for this new speed, the trim flaps would be raised sufficiently to allow the stick to be moved forward to its new "hands off" position at minus 3.2 degrees, approximately.

If desired, the balance spring assembly could be adjusted to be shorted (fixed end raised), so that the Trim Envelope could become merely a point, lying at the vertex. Then the control stick would trim "hands off" at 0 degrees at all speeds.

Another useful possibility is to further elevate the fixed end of the balance spring assembly, which in effect moves line Fs straight to the right across Figure 4, until the Trim Envelope line crosses the Vi lines to the right of 0 degrees stick position. The two dashed lines of Figure 4 represent this condition. Without the bellows force, the stick would trim to plus 4 degrees.

When the bellows force is included, and the aircraft is flying at 150 M. P. H., for example, stick position for 0 force is plus 2 degrees in this case. If the velocity were now changed to say 300 M. P. H., the stick would tend to move forward to approximately plus 0.9 degree, which, in some airplanes, is the proper direction required if re-trimming were desired at this new speed. In this case, the present force producer linkage would serve as an automatic trimming device to reduce the amount of manual trimming required. Such a reduction in force is considered to amount to a reduction of stability, and would only be used for extremely stable airplanes.

No matter what position or slope is chosen for the line Fs, the "hands off" position of the control stick is still modified by the amount and direction of normal acceleration, which determines the moment of force applied by the bob weight. If desired, the balance spring force Fs might even be made substantially constant for all stick positions, resulting in a condition where no stick centering forces are obtained except those due to airspeed and applied load factor. In addition, the bellows linkage can be made to give zero moment at stick positions other than neutral, and the bellows and its linkage attachment points can also, of course, be located in an infinite number of positions about the stick pivot, the important consideration being which stick position will correspond with zero bellows moment about the stick pivot.

From the above description it will be apparent that there is thus provided a device of the character described possessing the particular features of the advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect; and the invention is, therefore, claimed in any of its forms or modifications within the legitimate and valid scope of the appended claims.

What is claimed is:

1. In an airplane having an elevation control surface and a pilot's control element movable about a pivot to deflect said elevation control surface, the combination of a servo-motor unit interposed between said control element and said control surface for obtaining a desired deflection of said control surface without imposing any control surface reactive forces on said control element, a weight fixed to said control element forward of said pivot, and elastic weight-balancing means connected between said control element and a fixed point on said airplane to develop a component of force opposite to the pull of gravity on said weight, said elastic balancing means comprising two relatively slidable coextensive members elastically held in a composite retracted position by a compression spring, a first terminal connection on the first of said two members for applying tension thereto to extend said members against the force of said spring when the second member is held, an out-turning flange on said second member, a third member having a hollow interior extent assembled over said second member and slidable axially thereon, said third member having stop means near one end thereof in position to contact and prevent said flange from sliding past said stop means out of said third member in response to tension in said first member, and a second terminal connection on the other end of said third member, said terminal connections being connected to said control element and said fixed point, respectively, at locations such that said first and second members are positioned to travel freely as a unit within said hollow interior when said control element is in aft positions where appreciable positive normal accelerations are imposed on said airplane.

2. In an airplane having a control element movable about a pivot for movement of elevation control surfaces of said airplane through actuation of a power-operated servo-mechanism, the combination with said control element of a weight fixed to said control element forward of said pivot, elastic weight-balancing means connected between said control element and a fixed point on said airplane to develop a component of force opposite to the pull of gravity on said weight; and a control device producing a pressure in proportion to a function of airspeed connected to said control element to tend to neutralize said control element at a predetermined position, said elastic balancing means comprising an assembly of two relatively movable coextensive members elastically urged to a composite retracted position, a third hollow member positioned around said first two members and freely movable thereover in line with the extension and retraction of said first two members to provide a minimum and a maximum free length of said assembly, and means operative at said maximum free length for stopping motion of one of said first two members relative to said third member to provide for elastically opposed extension of the other of said first two members beyond said maximum free length.

3. In a tailless airplane having two powered elevon control surfaces movable both in the same direction for pitch control and in opposite directions for roll control, the combination with said elevons of a control stick mixer connected to operate said elevons as recited and comprising a trunnion member forming a lateral axis for rotation of a control stick member in a fore-and-aft direction and moving with said stick member in said fore-and-aft direction but not moving with said stick member in lateral directions, a support fixed to said trunnion member and projecting forward of said axis, a bob weight fixed to said support to produce a moment of force tending to move said stick member forward above said axis, elastic balancing means connected between said support and a fixed point on said airplane to produce a moment of force tending to move said stick member backward above said axis, and a control device producing a pressure in proportion to a function of airspeed connected to said support to produce a moment of force tending to restore said stick member to a predetermined neutral fore-and-aft position from either side of said neutral position, said elastic balancing means comprising two relatively slidable coextensive members elastically held in a composite retracted position by a compression spring, a first terminal connection on the first of said two slidable members for applying tension thereto to extend said slidable members against said spring when the second slidable member is held, an out-turning flange on said second slidable member, a third slidable member having a hollow interior extent assembled over said second slidable member and slidable axially thereon, said third slidable member having stop means near one end thereof in position to contact and prevent said flange from sliding past said stop means out of said third slidable member in response to tension in said first slidable member, and a second terminal connection on the other end of said third slidable member, whereby said first two slidable members can freely slide as a unit in either direction within said hollow extent when said terminal connections are relatively close to each other, and whereby separation of said terminal connections is elastically opposed when said connections are relatively far apart beyond the position where said flange and said stop means are in contact.

4. In an airplane having a control element movable about a pivot for movement of elevation control surfaces of said airplane, the combination of a weight fixed to said control element forward of said pivot, elastic weight-balancing means connected between said control element and a fixed point on said airplane to develop a component of force opposite to the pull of gravity on said weight, and a control device producing a pressure in proportion to a function of airspeed connected to said control element to tend to neutralize said control element at a predetermined position, said elastic balancing means being positioned so that the static combination of said weight and said elastic balancing means determines a position of equilibrium of said control element which is forward of said predetermined neutral position determined by said control device.

5. In a tailless airplane having two powered elevon control surfaces movable both in the same direction for pitch control and in opposite directions for roll control, the combination of a control stick mixer connected to operate said elevons as recited and comprising a trunnion member forming a lateral axis for rotation of a control stick member in a fore-and-aft direction and moving with said stick member in said fore-and-aft direction but not moving with said stick member in lateral directions, a support fixed to said trunnion member and projecting forward of said axis, a bob weight fixed to said support to produce a moment of force tending to move said stick member forward above said axis, elastic balancing means connected between said support and a fixed point on said airplane to produce a moment of force tending to move said stick member backward above said axis, and a control device producing a pressure in proportion to a function of airspeed connected to said support to produce a moment of force tending to restore said stick member to a predetermined neutral fore-and-aft position from either side of said neutral position, said elastic balancing means being positioned so that the static combination of said bob weight force and said elastic balancing means force determines a position of equilibrium of said stick member which is forward of said neutral position determined by said control device force.

6. In an airplane having an elevation control surface and a pilot's control element movable about a pivot to deflect said control surface, the combination of a weight fixed to said control element forward of said pivot, and elastic means connected between said control element and a fixed point on said airplane to develop a component of force opposite to the pull of gravity on said weight, said elastic means comprising an assembly of two relatively movable coextensive members elastically urged to a composite, retracted position, a third hollow member positioned around said first two members and freely movable thereover in line with the extension and retraction of said first two members to provide a minimum and a maximum free length of said assembly, and means operative at said maximum free length for stopping motion of one of said first two members relative to said third member to provide for elastically opposed extension of the other of said first two members beyond said maximum free length.

7. In an airplane having an elevation controlling surface operated by a pilot's control element without exerting feel-back forces on said element; in combination with said control element, means for creating a first force varying in accordance with airspeed; means for creating a second force varying with normal accelerations imposed on said airplane by movements of said surface; means for applying said first force to said control element to tend to restore said pilot's control element to a center position from either side thereof, and means for applying said second force to said control element to modify the effect of said first force in a direction tending to move said control element to reduce said accelerations; said means for applying said second force including a spring so connected at points between said airplane and said control element that said spring cancels said second force, only at a 1 "g" static position of said control element, which static position is displaced from said center position in the direction toward which said control element is moved to lower the nose of said airplane.

8. In an airplane having an elevation controlling surface operated by a pilot's control element without exerting feel-back forces on said element; in combination, means operatively connected to said control element creating a first force thereon directed to tend to restore said control element to a center position; a weight directly attached to said control element to create a second force thereon varying in accordance with normal accelerations experienced by said airplane; said weight being attached to apply said second force in a direction tending to move said control element to reduce said acceleration; and a spring so connected at points between fixed aircraft structure and said control element that said spring cancels said second force produced on said control element by said weight, only, at a 1 and "g" static position of said control element, which static position is displaced from said center position in the direction toward which said control element is moved to lower the nose of said airplane.

9. In an airplane having a control surface operated by a pilot's control element without exerting feel-back forces on said control element; the combination with said control element comprising elastic means operatively connected to said control element to create a first centering force thereon to tend to restore said control element to a center position; a weight directly attached to said control element to create a second force thereon varying in accordance with normal accelerations experienced by said airplane; said weight being attached to apply said second force in a direction tending to move said control element to reduce said acceleration, and a spring so connected between fixed aircraft structure and said control element as to cancel said second force produced on said control element by said weight only, at a 1 "g" static position of said control element, said 1 "g" static position being different from said center position.

10. In an airplane having a pilot's control element movable about a pivot for movement of an elevation control surface of said airplane; the combination with said control element comprising a weight fixed to said control element forward of said pivot, elastic weight-balancing means connected between said control element and a fixed point on said airplane to develop a component of force on said control element opposite to the pull of gravity on said weight; and a control device producing a pressure in proportion to a function of airspeed connected to said control element to tend to neutralize said control element at a predetermined position, said elastic balancing means having a value of force such that the static combination of said weight and said elastic balancing means determines a position of equilibrium of said control element, said equilibrium position being different from said predetermined neutral position established by said control device alone.

IRVING L. ASHKENAS.

References Cited in the file of this patent

UNITED STATES PATENTS

| Number | Name | Date |
|---|---|---|
| 1,154,396 | Hayot | Sept. 21, 1915 |
| 1,832,254 | Spanovic | Nov. 17, 1931 |
| 1,885,578 | Boykow | Nov. 1, 1932 |
| 2,092,424 | Potez | Sept. 7, 1937 |
| 2,227,784 | Koch | Jan. 7, 1941 |
| 2,445,343 | Tyra | July 20, 1948 |

FOREIGN PATENTS

| Number | Country | Date |
|---|---|---|
| 449,431 | France | Dec. 23, 1912 |